United States Patent
Ebiko

(10) Patent No.: US 6,628,346 B1
(45) Date of Patent: Sep. 30, 2003

(54) REFLECTION TYPE LIQUID CRYSTAL PROJECTOR

(75) Inventor: Naoki Ebiko, Kanagawa-ken (JP)

(73) Assignee: Fujitsu General Limited, Kawasaki (JP)

( * ) Notice: Subject to any disclaimer, the term of this patent is extended or adjusted under 35 U.S.C. 154(b) by 0 days.

(21) Appl. No.: 09/856,001

(22) PCT Filed: Aug. 8, 2000

(86) PCT No.: PCT/JP00/05315

§ 371 (c)(1),
(2), (4) Date: May 15, 2001

(87) PCT Pub. No.: WO01/25838

PCT Pub. Date: Apr. 12, 2001

(30) Foreign Application Priority Data

Sep. 30, 1999 (JP) .......................................... 11/280862

(51) Int. Cl.⁷ ............................................ G02F 1/1335
(52) U.S. Cl. ............................................ 349/9; 353/34
(58) Field of Search ............................ 349/5, 9; 353/30, 353/31, 33, 34

(56) References Cited

U.S. PATENT DOCUMENTS 6,176,586 B1 * 1/2001 Hirose et al. ................. 353/31
6,343,864 B1 * 2/2002 Tajiri ............................. 353/20
6,388,718 B1 * 5/2002 Yoo et al. ....................... 349/9

* cited by examiner

*Primary Examiner*—Kenneth Parker
(74) *Attorney, Agent, or Firm*—Flynn, Thiel, Boutell & Tanis, P.C.

(57) ABSTRACT

The object of the present invention to reduce the cost and the weight of a reflection liquid crystal projector which is designed to project an image formed by synthesizing the R, B and G images produced by the LCD 24 for R, the LCD 28 for B and the LCD for G on a screen through a projector, and containing a polarized light conversion element 12 for converting the white light outputted from the light source 10, to an S-polarized light, a color separation element 40 for separating the R, B and G lights from the S-polarized light, converting the G light to a P-polarized light, setting the directions of R light, B light and G light orthogonal to one another and setting the directions of the B and G lights in the same direction, a first PBS 52 for reflecting the R light outputted from a color separation element 40, to fall on a LCD 24 for R to be reflected and outputted thereby, a second PBS 54 for reflecting the B light outputted from the color separation element 40, so as to fall on a LCD 28 for B, for transmitting the G light so as to fall on a LCD 32 for G and outputting the reflected lights, and a dichroic prism 56 for synthesizing the R, B and G lights, which are outputted from the first PBS 52 and the second PBS 54, to be outputted to a projection lens 36.

13 Claims, 6 Drawing Sheets

REFLECTION TYPE LIQUID CRYSTAL PROJECTOR

TECHNICAL FIELD OF THE INVENTION

The present invention relates to a reflection liquid crystal projector designed so that a colored image, which are synthesized from the images of a first, a second and a third colors (e.g., R, B and G lights) formed on a first, a second and a third panels (e.g., reflection panels for R, B and G) respectively, can be projected on a screen through a projection lens.

BACKGROUND ART

Conventionally, it has been a common practice that a reflection liquid crystal projector has a composition as is shown in FIG. 1. That is, the white light outputted from a light source 10 is converted into an S-polarized light by a polarized light conversion element 12; of the S-polarized light, the R light (Red light) is separated from the B light (Blue light) and G light (Green light) by a cross dichroic mirror 14; the B and G lights are led to the dichroic mirror 18 by means of a cross dichroic mirror 14; the B and G lights are led to the dichroic mirror 18 by means of a total reflection mirror 16 to be separated into the B light and G light.

The separated R light is led to a first polarization beam splitter 22 (hereinafter referred to the first PBS) by a total reflection mirror 20; the R light is reflected by the polarizing film of the first PBS to fall on a reflection liquid crystal panel 24 (hereinafter referred to as the LCD for R), and the reflected light (converted into a P-polarized light from an S-polarized light) is outputted through the splitter 22.

The separated B light is reflected by the polarizing film of a second polarization beam splitter 26 (hereinafter referred to as the second PBS) to fall on a reflection liquid crystal panel 28 (hereinafter referred to as the LCD for B), the panel being provided for the display of B image, and the reflected light (converted to P-polarized light from the S-polarized light) is outputted through the beam splitter 26.

The separated G light is reflected by the polarizing film of a third polarization beam splitter 30 (hereinafter referred to the third PBS) to fall on a reflection liquid crystal panel 32 (hereinafter referred to as the LCD for G), the panel being provided for the display of a G image, and the reflected light (converted to P-polarized light from S-polarized light) is outputted passing through the beam splitter 30.

A cross prism 34 not only reflects the R and B lights, outputted from the first and the second PBS's 22 and 26, but also passes the G light outputted from the third PBS 30 to synthesize the R, B and G lights to display a colored image by projecting the synthesized light on a screen (not shown) through a projection lens 36.

However, such a conventional method shown in FIG. 1 has problems as are given below.

(1) Using an expensive cross prism 34 as a color synthesizing element results in the high price of a projector. More specifically, using the cross prism, which is to be assembled with four parts, results in low yield, high price and increase in weight of the projector.
(2) Needing 3 PBS's, i.e., the first PBS 22, the second PBS 26 and the third PBS 30, contributes not only to a high cost but also an increase in weight.

The present invention is made in consideration of the above-mentioned problems and is intended to provide a low-price and lightweight reflection liquid crystal projector by eliminating the costly cross prism and decreasing the required number of polarization beam splitters.

DISCLOSURE OF THE INVENTION

The present invention relates to a reflection liquid crystal projector designed for displaying a colored image, through a projector, on a screen by synthesizing a first, a second and a third color light (e.g., R, B and G lights) produced on a first, a second and a third reflection liquid crystal panel (e.g., LCD's for R, B and G), the projector comprising a light source for outputting a white light, a polarized light conversion element for converting the white light outputted from the light source into either a P-polarized light or a S-polarized light for output, a color separation element for not only separating the polarized light outputted from the polarized light conversion element into the first, the second and the third colored lights but also for outputting the two color lights (e.g., B and G lights), differing in the direction of polarization but traveling in the same direction, out of the first, the second and the third color lights, while outputting the remaining one color light (e.g., R light) in a direction perpendicular to the direction of the two color lights (e.g., B and G lights), a first polarized beam splitter for not only permitting one (e.g., G light) of the two color lights to pass through but also reflecting the other (e.g., B light) to fall on corresponding reflection liquid crystal panels (e.g., LCD's for G and B) for being outputted as reflected lights, a second polarization beam splitter for letting one colored light, the remainder of the color lights outputted from the color separation element falling on a corresponding one (e.g., LCD for R) of the first, the second and the third reflection liquid crystal panels so that the light can be outputted as a reflected light, and a dichroic prism for synthesizing the first, the second and the third color lights, outputted from the first and the second polarized beam splitters, for output to the projection lens.

In such a composition, the white light outputted from the light source by means of the polarized light conversion element is converted into either one (e.g., S-polarized light) of the S-polarized light or the P-polarized light; the polarized light is separated into the first, the second and the third color lights by the color separation element; the two color lights (e.g., B and G lights), differing in the direction of the polarization, out of the first, the second and the third color lights, are outputted in the same direction, while the remaining one color light,(e.g., R light) is outputted in a direction perpendicular to the output direction of the two color lights (e.g., B and G lights). The two color lights (e.g., G and B lights) outputted in the same direction from the color separation element are made to fall on corresponding reflection liquid crystal panels (e.g., LCD for G and B) by means of the first polarized beam splitter so that the reflected lights are outputted to the dichroic prism. The remaining one color light (e.g., R light), separated by the color separation element is made, by the second polarized beam splitter, to fall on a corresponding reflection liquid crystal panel (e.g., LCD for R) so that the reflected light is outputted to the dichroic prism. The dichroic prism synthesizes the first, the second and the third color lights outputted from the first and the second polarization beam splitters, and the synthesized light is projected, through the projection lens, to display the colored image on a screen.

Therefore, in the case of the present invention, not only the 3 sets of the polarized beam splitters necessary for the conventional projector can be reduced to 2 sets but also the costly cross prism as a color synthesizing element can be omitted, contributing to the realization of a low-price and lightweight projector.

In order to simplify the composition of the color separation element, the color separation element is made to comprise a first and a second dichroic mirror and a first and a second total reflection mirror. Of the polarized lights outputted from the polarized light conversion element, the first and the second color lights are allowed to pass through the first dichroic mirror while the third color light is reflected thereby. The first and the second color lights, which have passed through the first dichroic mirror, are reflected by the first total reflection mirror in a direction bent by 90°, while the third color light, reflected by the first dichroic mirror, is reflected by the second total reflection mirror in a direction bent by 90°; the second dichroic mirror not only permits one of the first and the second color lights, which have been reflected by the first total reflection mirror, to pass through it while reflecting the other but also reflects for output the third color light reflected by the second total reflection mirror. A phase element performs the functions described in (1) or (2) given below.

(1) The phase element is provided in the optical path by which the third color light reflected by the first dichroic mirror arrives at the second dichroic mirror through the second total reflection mirror so that the direction of the polarization of the third color light, which has been reflected by the first dichroic mirror, is converted by the phase element (e.g., conversion from the S-polarized light to P-polarized light).

(2) The phase element is provided in the light path by which the first and the second color lights, which have passed through the first dichroic mirror, arrive at the second dichroic mirror through the first total reflection mirror so that the direction of the polarization of the at least one of the first and the second colored lights is converted by the phase element (e.g., conversion from S-polarized light to P-polarized light).

For the simplicity of the construction, the color separation element is made to comprise the first, the second and the third dichroic mirrors, the total reflection mirror and the phase element so that the first dichroic mirror permits the transmission of the first and the second color light while reflecting the third color light out of the polarized lights which are outputted from the polarized light conversion element; the third dichroic mirror transmits one of the first and the second color lights, which have passed through the first dichroic mirror, while reflecting the other; the total reflection mirror reflects the third color light, which has been reflected by the first dichroic mirror, in a direction bent by 90°; the second dichroic mirror transmits the color light, which has been reflected by the third dichroic mirror, and reflects the color light, which has been reflected by the total reflection mirror, to make these color lights be outputted in the same direction; the phase element performs the function described in (1), (2) or (3) given below.

(1) The phase element is provided in the optical path through which the third color light, which has been reflected by the first dichroic mirror, arrives at the second dichroic mirror by way of the second dichroic mirror so that the direction of the polarization of the third color light, which has been reflected by the first dichroic mirror, is converted (e.g., from S-polarized light to P-polarized light) by the phase element.

(2) The phase element is provided in the optical path by which the first and the second color lights, which have passed through the first dichroic mirror, arrive at the third dichroic mirror so that the direction of the polarization of at least one of the first and the second color lights, which have passed through the first dichroic mirror, can be converted (e.g., from the S-polarized light to P-polarized light) by the phase element.

(3) The phase element is provided in the optical path by which the color light reflected by the third dichroic mirror arrives at the second dichroic mirror so that the direction of the polarization of the color light reflected by the third dichroic mirror can be converted (e.g. from S-polarized light to P-polarized light) by the phase element.

In order to eliminate the aberration occurring with the first and the second polarized beam splitters, the first and the second polarized beam splitter prisms are used instead of the first and the second polarized beam splitters. More particularly, the aberration occurring when the angle of incidence is not orthogonal can be eliminated by making the light fall on and be reflected orthogonally by each of the first and the second polarized beam splitters.

In order make the assembling easier by reducing the number of the parts, the first and the second polarized beam splitters and the dichroic prism are integrated into a prism block. That is, not only the number of the parts can be reduced but also the assembling of the parts can be made easier by integrating the first and the second polarization beam splitters and the dichroic prism into one prism block.

In order to simplify the composition of the phase element, a ½ wave plate, whose face is disposed orthogonally to the falling light, is employed as the phase element.

In order to dispense with a member for holding the phase element (a holder) for low cost and lightweight, as well as for reducing the optical path length, the phase element is composed of a total reflection mirror disposed so that its reflection face is at 45° to the incoming color light and a ¼ wavelength film securely attached to the reflection face of the total reflection mirror. More particularly, by forming the phase element with a ¼ wavelength film attached securely to the reflection face of the total reflection mirror, the member for holding the phase element in position can be omitted, thereby contributing not only to the low cost and lightweight but also the reduction of the optical path length owing to the omission of the space which is necessary if the phase element is provided as an independent part.

BEST MODE FOR CARRYING OUT THE INVENTION

The embodiments of the present invention will be described below referring to the corresponding drawings.

Figure 1:
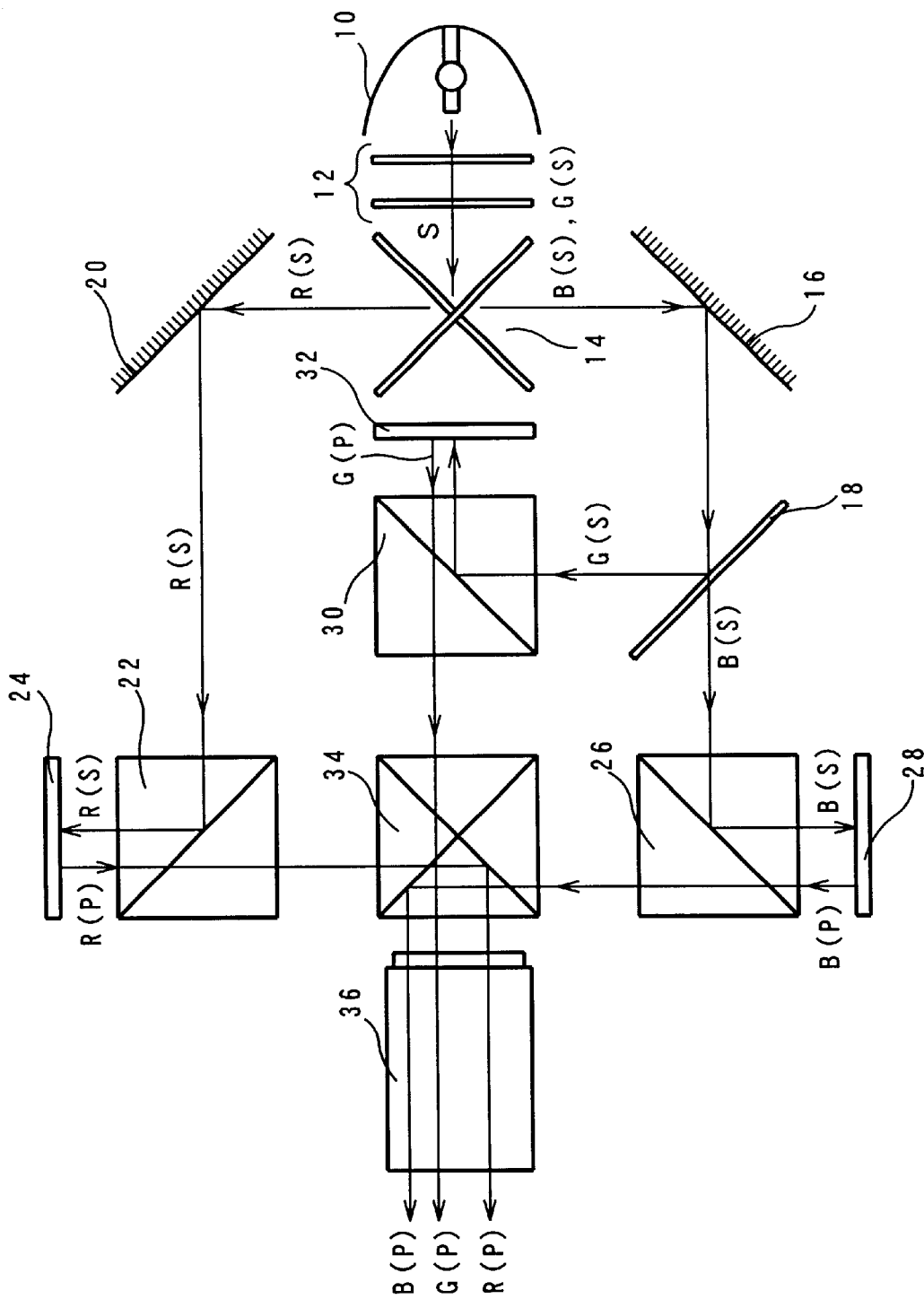
FIG. 1 is a composition diagram of a conventional reflection liquid crystal projector.
Figure 2:
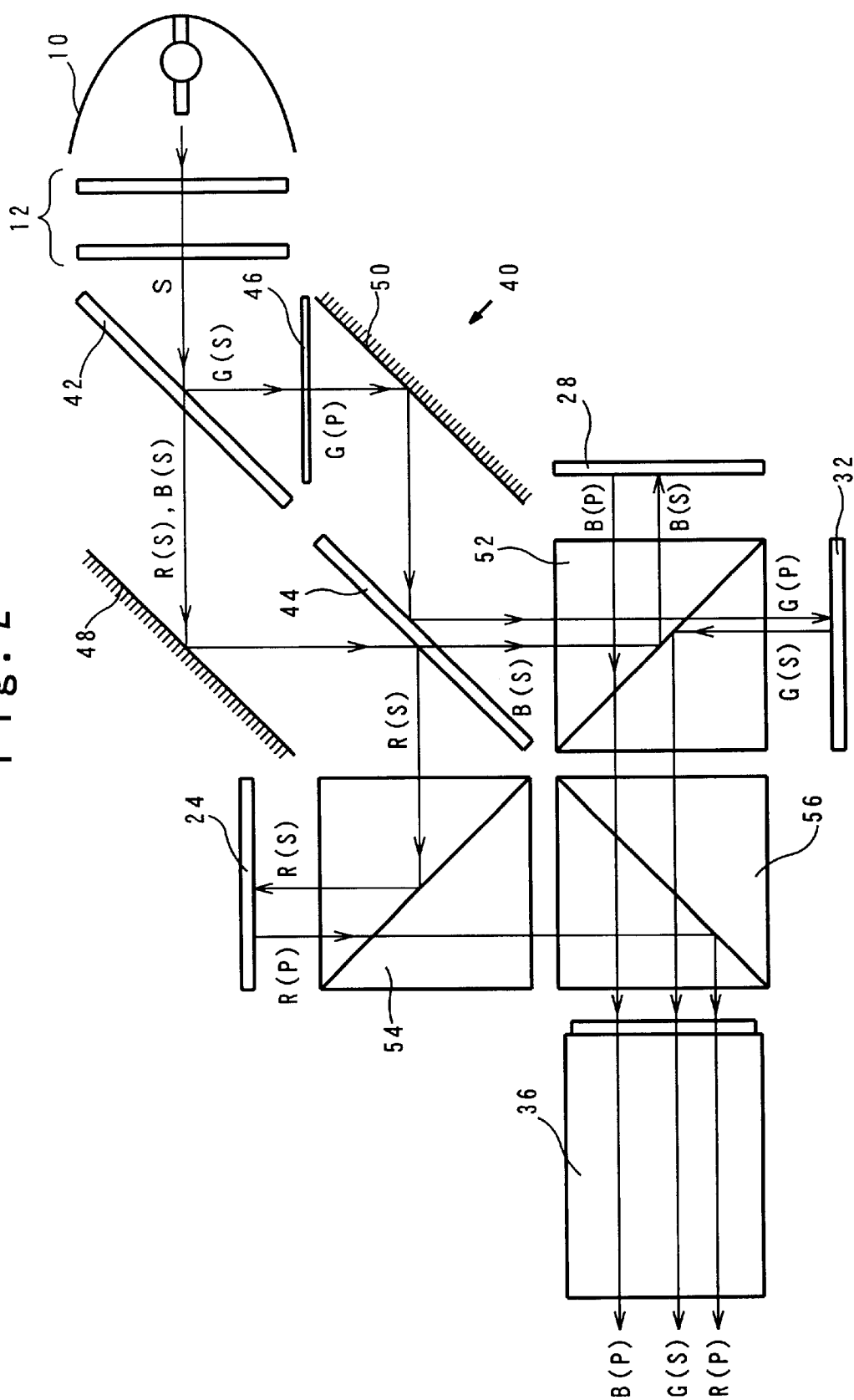
FIG. 2 is a composition diagram showing the reflection liquid crystal projector as the first embodiment of the present invention.

FIG. 2 shows a reflection liquid crystal projector as an embodiment of the present invention, wherein the explanations of those parts common to those in FIG. 1 and with common reference numerals assigned thereto will be omitted or abbreviated.

In FIG. 2, 10 represents a light source; 12, a polarized light conversion element; 24, 28 and 32, reflection liquid crystal panels for red, blue and green colors (hereinafter referred to as LCD's for R, B and G) as being examples of the first, the second and the third reflection liquid crystal panels; 36, a projection lens.

The light source 10 outputs a white light; the polarized light conversion element 12 converts the white light outputted from the light source 10 to a S-polarized light for output; the LCD's 24, 28 and 32 for R, B and G respectively display the images of a red light, a blue light and a green light (hereinafter referred to as R light, B light and G light), as being examples of the first light color, the second light color and the third light color, according to the video signals from a display control circuit (not shown).

40 represents a color separation element (or a color resolution element) comprising a first dichroic mirror 42, a second dichroic mirror 44, a ½ wavelength plate 46, a first total reflection mirror 48 and a second total reflection mirror 50. The ½ wavelength plate 46 is an example of a phase element.

The first dichroic mirror 42 transmits the R and B lights while reflecting the G light, with respect to the S-polarized light outputted from the polarized light conversion element 12.

The ½ wavelength plate 46 converts the S-polarized light of the G light reflected by the first dichroic mirror 42 to a P-polarized light for output.

The first total reflection mirror 48 reflects the R light and the B light, which have passed through the first dichroic mirror, in a direction bent by 90°.

The second total reflection mirror 50 orthogonally reflects the G light outputted from the ½ wavelength plate 46.

The second dichroic mirror 44 not only reflects the R light, which has been reflected by the first total reflection mirror 48, but also transmits the B light, which has been reflected by the first total reflection mirror 48, while reflecting the G light, which has been reflected by the second total reflection mirror 50.

52 and 54 represent the first and the second polarized beam splitter prisms (hereinafter referred to as the first PBS and the second PBS) as being the examples of the first and the second beam splitters, and 56 represents a dichroic prism.

The first PBS 52 not only reflects the B light, which has passed through the second dichroic mirror 44, so that it falls on the LCD 28 for B but also transmits, for output, the reflected light, which has been converted to a P-polarized light by being modulated by the LCD 28 for B; further, the first PBS 52 not only transmits the G light, which has been reflected by the second dichroic mirror 44, so that it falls on the LCD 32 for G but also reflects, for output, the reflected light, which has been converted to a S-polarized light by being modulated by the LCD 32 for G.

The second PBS 54 not only reflects the R light, which has been reflected by the second dichroic mirror 44, so as to fall on the LCD 24 for R but also transmits, for output, the reflected light, which has been converted to a P-polarized light by being modulated through the LCD 24 for R.

The dichroic prism 56 synthesizes the B and G lights, which have been outputted from the first PBS 52, with the R light, which has been outputted from the second PBS 54, to output the synthesized light to the projection lens 36.

Next, the function of a projector shown in FIG. 2 will be explained.

(1) The white light outputted from a light source 10 is converted to a S-polarized light by means of a polarized light conversion element 12 and then separated in to the R light and the G light by means of the first dichroic mirror 42.

After having been separated, the R light and the G light are guided by the first total reflection mirror 48 to fall on the second dichroic mirror 44.

After having been separated, the G light is converted to a P-polarized light by means of the ½ wavelength plate 46 and then guided by the second total reflection mirror 50 to fall on the second dichroic mirror 44.

Incident B light passes through the second dichroic mirror 44 to be outputted to the first PBS 52, while the incident G light is reflected by the second dichroic mirror 44 to be inputted to the first PBS 52. The incident R light is reflected by the second dichroic mirror 44 to be inputted to the second PBS 54.

(2) The B light inputted to the first PBS 52 is reflected by the polarizing film thereof to fall on the LCD 28 for B, whereby the reflected light thereof is transmitted through the polarizing film to be outputted. In this case, the reflected light from the LCD 28 for B has been converted to a P-polarized light by being modulated through LCD 28 for B.

The G light inputted to the first PBS 52 passes through its polarizing film to be inputted to the LCD 32 for G while the light reflected by the polarizing film is outputted. In this case, the light reflected by the LCD 32 for G is converted to a S-polarized light by being modulated by the LCD 32 for G.

The R light falling on the second PBS 54 is reflected by the polarizing film thereof so as to fall on the LCD 24 for R, and the reflected light thereof is outputted passing through the polarizing film. In this case, the light reflected by the LCD 24 for R has been converted to a P-polarized light by being modulated by the LCD 24 for R.

(3) The B light and the G light outputted from the first PBS 52 and the R light outputted from the second PBS 54 are synthesized by the dichroic prism 56, and the synthesized light is projected through the projection lens 36 to form a color image on a screen.

In the case of the above embodiment, the first and the second polarization beam splitter prisms and the dichroic prism are composed of different components respectively, but the present invention is not limited to such an embodiment and is applicable to the case where these first and second polarization beam splitter prisms and the dichroic prim are integrated into a prism block.

Figure 3:
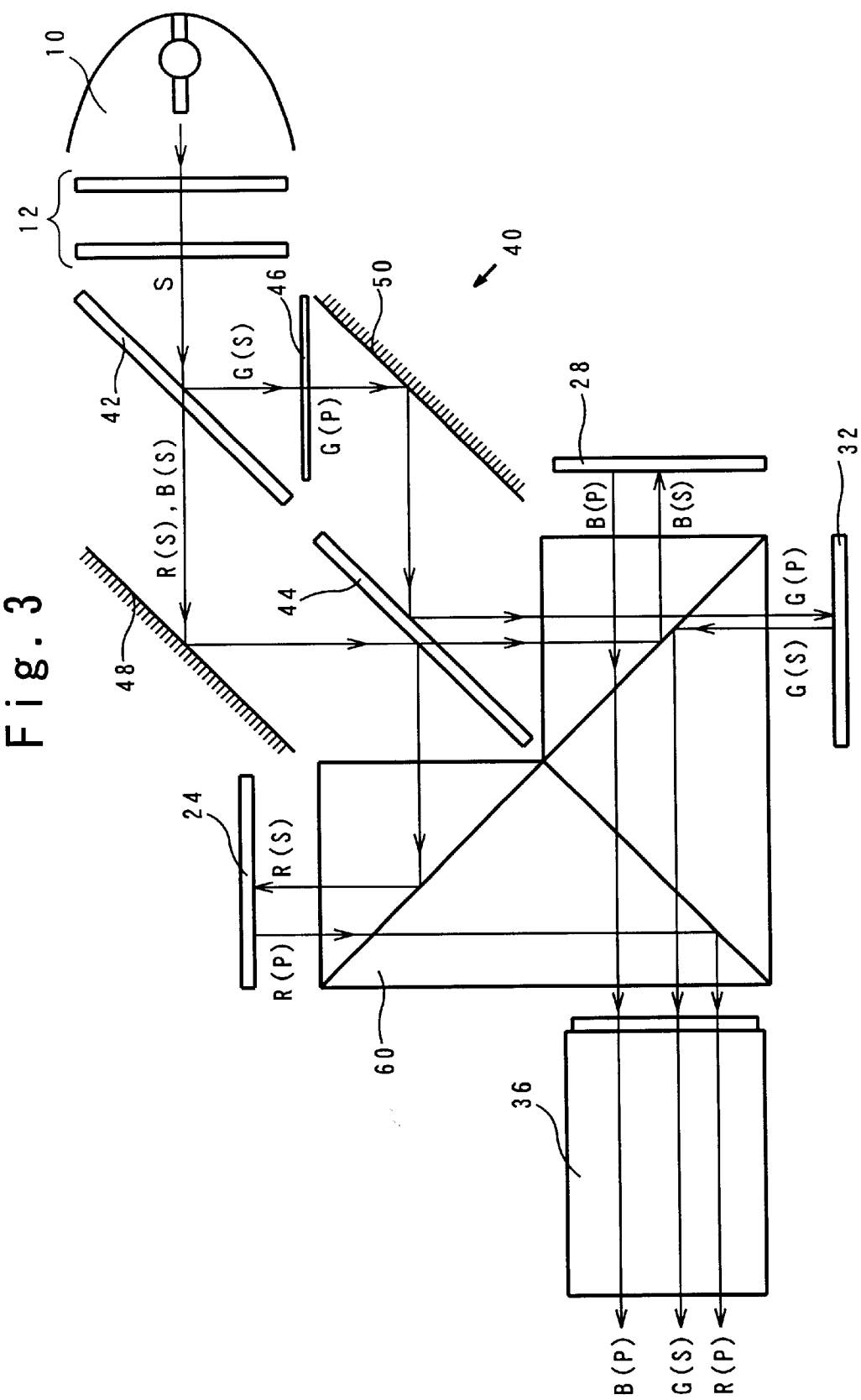
FIG. 3 is a composition diagram showing the reflection liquid crystal projector as the second embodiment of the present invention.

For instance, as shown in FIG. 3, the present invention is applicable to the case where the prism block 60 is substituted for the first and the second PBS 52 and 54 and the dichroic prism 56 which are shown in FIG. 1. In the case of FIG. 3, the number of the parts can be reduced, resulting in easier assembly of the parts.

In the case of the above embodiment, for simplicity of the composition, the color separation element is made to comprise the first and the second dichroic mirrors, the phase element and the first and the second total reflection mirrors, but the present invention is not limited to this embodiment and is also applicable to a case where the color separation element is designed for being not only capable of separating the polarized light (e.g., an S-polarized light) outputted from the polarized light conversion element into the R, B and G lights but also capable of converting the polarized G light to another polarized light and outputting the R light and B light in a same direction and orthogonal to the direction of the G light.

Figure 4:
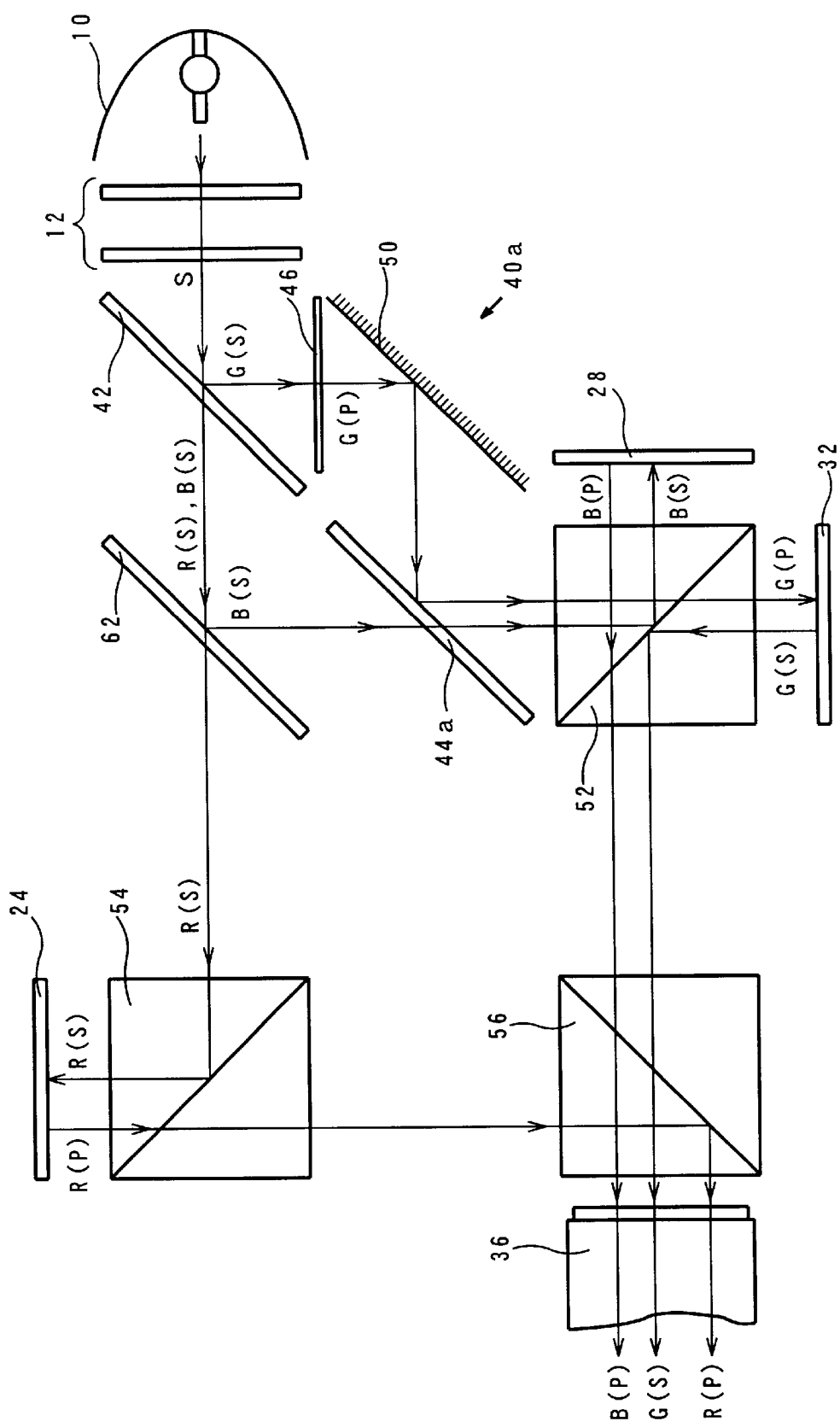
FIG. 4 is a composition diagram showing the reflection liquid crystal projector as the third embodiment of the present invention.

For instance, as shown in FIG. 4, the present invention is applicable to a case where the color separation element 40a comprises the first dichroic mirror 42, the second dichroic mirror 44a, the third dichroic mirror 62, the ½ wavelength plate 46 and the total reflection mirror 50.

In FIG. 4, the first dichroic mirror 42 transmits the R light and the B light while reflecting the G light with respect to the S-polarized light outputted from the polarized light conversion element 12.

The ½ wavelength plate converts, for output, the G light, reflected by the first dichroic mirror 42, to an S-polarized light from a P-polarized light.

The third dichroic mirror 62 transmits the R light out of the R light and the B light, which have passed through the first dichroic mirror 42, while reflecting the B light.

The second dichroic mirror 44a transmits the B light, which has been reflected by the third dichroic mirror 62, while reflecting the G light, which has been outputted from the ½ wavelength plate 46 and guided by the total reflection mirror 50.

Since the compositions and functions of the LCD's 24, 28 and 32 for R, B and G, the first and the second PBS's 52 and 54, the dichroic prism 56, and the projection lens 36 are similar to those shown in FIG. 1, the explanations thereof are omitted here.

Further, in the case shown in FIG. 4, the interval between the third dichroic mirror 62 and the first PBS 52, the interval between the first PBS 52 and the dichroic prism 56, and the interval between the second PBS 54 and the dichroic prism 56 are increased respectively than in case of FIG. 1, whereby the optical path lengths of the R, B and G lights, which have been modulated respectively by the LCD's 24, 28 and 32 for R, B and G, to the dichroic prism 56 for the color synthesization become equal to one another.

In the case of the above embodiment, in order to simplify the composition of the color separation element, the color separation element is designed so as to be able to convert the white light outputted from the light source to a S-polarized light, but the present invention is not limited to such an embodiment but is also applicable to a case where the polarized light conversion element converts the white light, outputted from the light source, to a P-polarized light.

Figure 5:
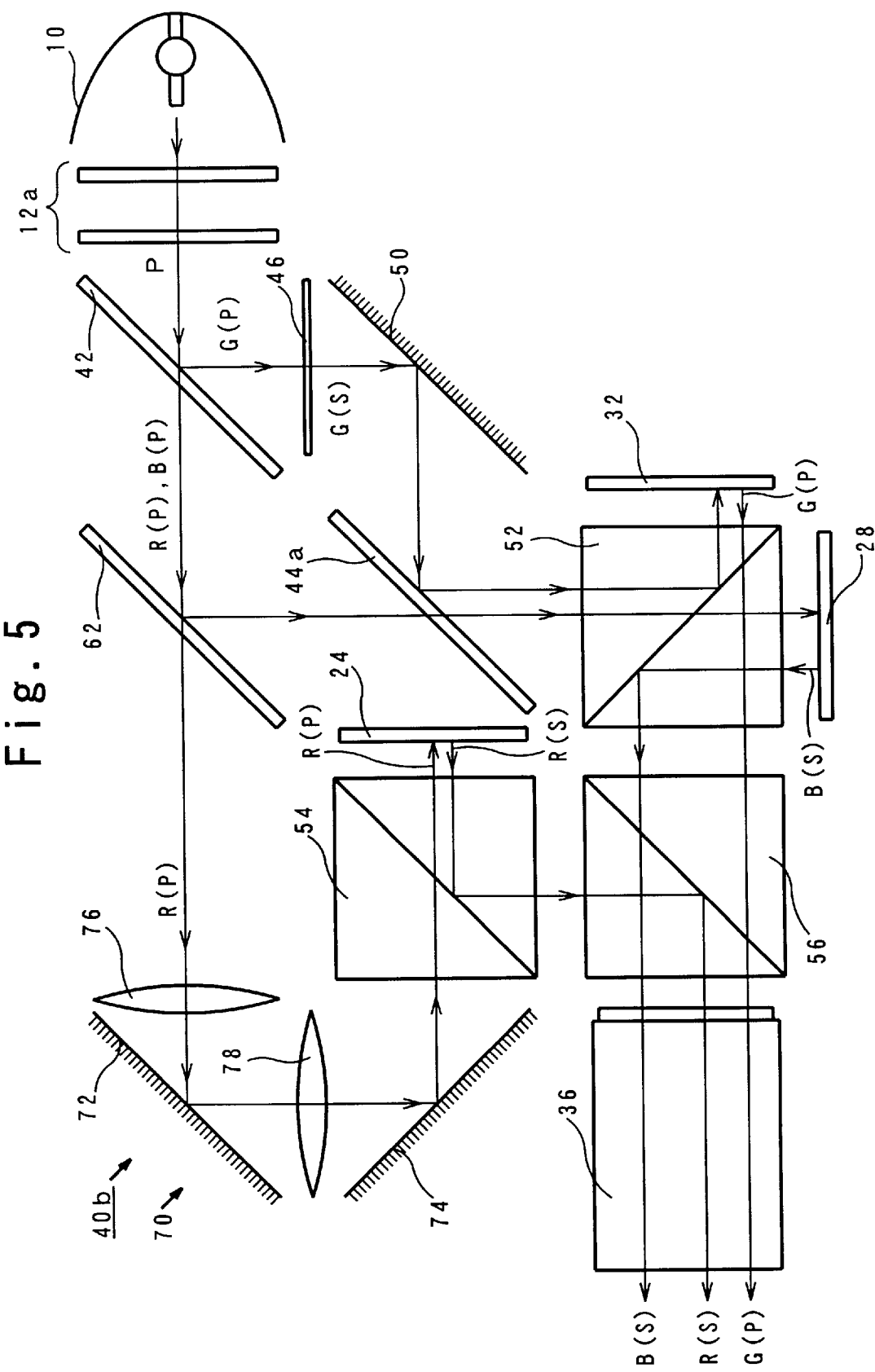
FIG. 5 is a composition diagram showing the reflection liquid crystal projector as the fourth embodiment of the present invention.

For instance, as shown in FIG. 5, the present invention is also applicable to a case where, instead of the polarized light conversion element shown in FIGS. 2 through 4, a polarized light conversion element 12a, which is designed to convert the white light outputted from the light source 10 to a P-polarized light for output, and the color separation element 40a shown in FIG. 4 is replaced with the color separation element 40b provided with an orthogonal (reflection) mirror 70.

In FIG. 5, the orthogonal mirror 70 comprises the total reflection mirrors 72 and 74, which are arranged at 90° to each other, and relay lenses 76 and 78, which are disposed on the incidence sides of the total reflection mirrors 72 and 74, and is designed to reflect the incident light in both a parallel and opposite directions.

Next, the function of the embodiment shown in FIG. 5 will be explained.

(1) The white light outputted from the light source 10 is converted to a P-polarized light by means of the polarized light conversion element 12a and then separated into the R, B and G lights by means of the first dichroic mirror 42.

The R and B lights, both separated (from the G light) by the first dichroic mirror, are then separated into the R light and the B light by the third dichroic mirror 62.

The R light separated by the third dichroic mirror 62 is made to travel in parallel and opposite direction to be inputted to the second PBS 54 by means of the relay lens 76, the total reflection mirror 72, the relay lens 78 and the total reflection mirror 74.

In the embodiment shown in FIG. 5, the distance to the LCD 24 for R to be covered by the R light is longer than the distances to the LCD's 28 and 32 for B and G to be covered by the B light and the G light, and so the luminous energies of the lights, deriving from the light source, arriving at the LCD's 24, 28 and 32 for R, B and G are equalized by adjusting the focusing of the R light by means of the relay lenses 76 and 78.

The B light separated by the third dichroic mirror is inputted to the second PBS by passing through the second dichroic mirror 44a.

The G light separated by the first dichroic mirror 42 is converted to a S-polarized light by the ½ wavelength plate, reflected by the total reflection mirror 50 to fall on and to be reflected by the second dichroic mirror 44a and inputted to the second PBS.

(2) When inputted to the first PBS 52, the B light passes through the polarizing film to fall on the LCD 28 for B, and its reflected light is reflected as an output. In this case, the light reflected by the LCD 28 for B is converted to a S-polarized light.

When inputted to the first PBS 52, the G light is reflected by its polarizing film and inputted to the LCD 32 for G, and the reflected light is outputted through the polarizing film. In this case, the reflected light from the LCD 32 for G is converted to a P-polarized light by being modulated the LCD 32 for G.

The R light, inputted to the second PBS 54, passes through the polarizing film thereof, falls on the LCD 24 for R, and its reflected light is reflected by the polarizing film and outputted. In this case, the reflected light from the LCD 24 for R is converted to a S-polarized light by being modulated the LCD 24 for R.

(3) The B and G lights, outputted from the first PBS 52, and the R light, outputted from the second PBS 54, are synthesized by the dichroic prism 56, and the synthesized light forms a color image on a screen when projected through the projection lens 36.

In the case of the above embodiment, in order to simplify the composition of the phase element, a ½ wavelength plate is used as the phase element, but the present invention is not limited to this embodiment, and is also applicable to a case where the G light reflected by the first dichroic mirror is converted to a P-polarized light from an S-polarized light or vice versa for output.

Figure 6:
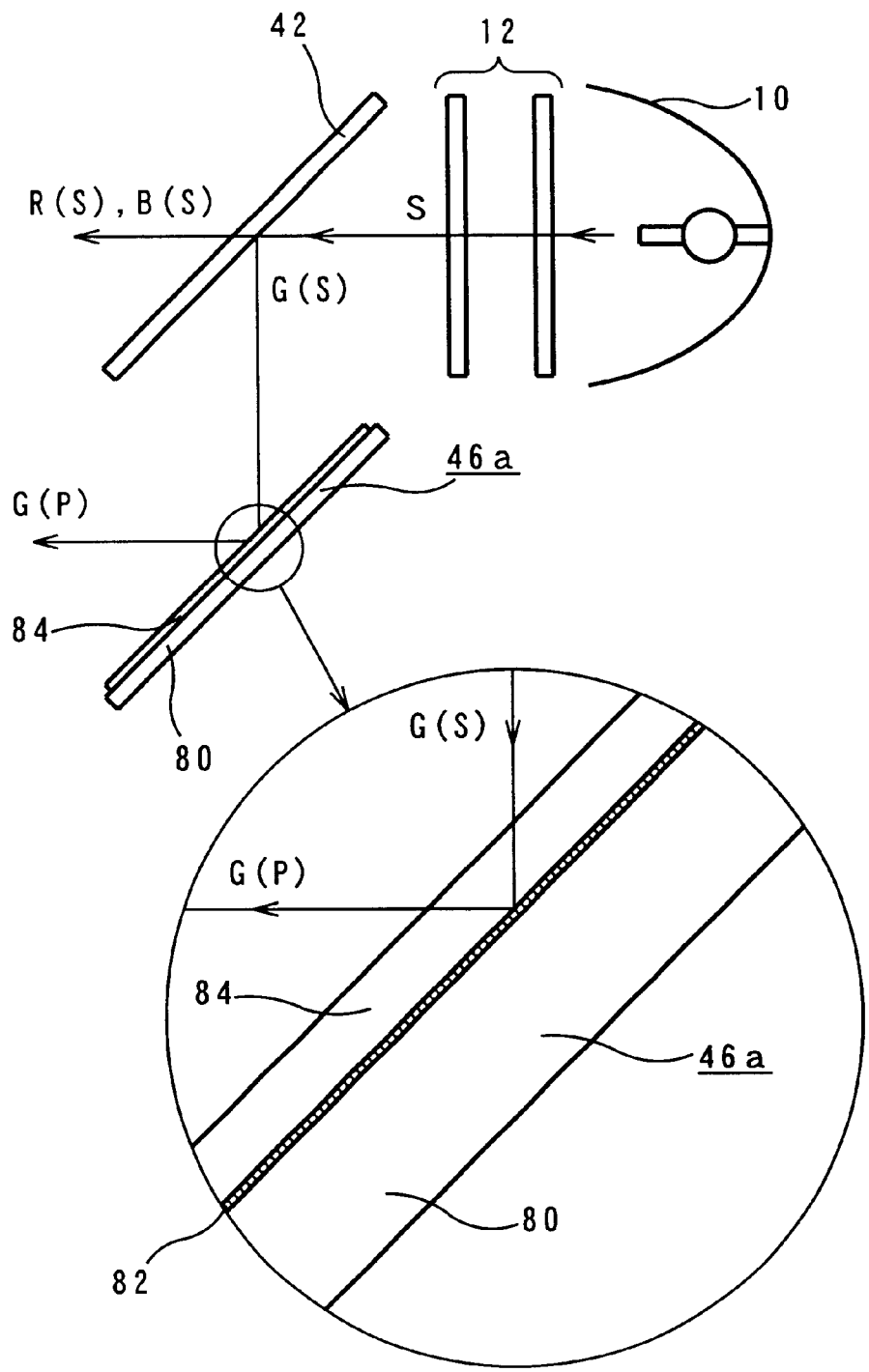
FIG. 6 is a composition diagram showing a phase element as another embodiment of the present invention.

For instance, as shown in FIG. 6, the present invention is also applicable to a case where the phase element 46a comprises a glass plate 80, disposed so that its surface is at 45° to the direction of incidence of the G light, and a ¼ wavelength film 84, securely attached through a total reflection film 82 to the surface of the glass plate 80 on which the G light falls. The glass plate 80 and the total reflection film 82 constitute a total reflection mirror, which corresponds to the total reflection mirror shown in FIG. 2 through FIG. 5.

In the embodiment shown in FIG. 6, the G light, reflected by the first dichroic mirror 42, first passes through the ¼ wavelength film 84 to be converted from an S-polarized light (or P-polarized light) to a circularly polarized light, reflected by the total reflection film 82 to pass through the ¼ wavelength film 84 to be converted from a circularly polarized light to a P-polarized light (or a S-polarized light) and outputted to the side of the second dichroic mirror 44 (or 44a) (not shown in FIG. 6).

In the case of the embodiment shown in FIG. 6, the phase element is formed with the total reflection mirror (i.e., the total reflection mirror comprising the glass plate 80 and the total reflection film 82) corresponding to the total reflection mirror 50, shown in FIG. 2 through FIG. 5, and a ¼ wavelength film 84, so that a member (a holder) for holding the ½ wavelength plate 46, shown in FIG. 2 through FIG. 5, can be omitted and not only contribute to reduction of the cost and weight but also to the reduction of the optical path length by omitting the ½ wavelength plate 46.

In the embodiment shown in FIG. 2, FIG. 4 or FIG. 5, in order to prevent the aberration occurring when the angle of incidence of the light on the first and the second polarization beam splitters is not orthogonal, each of the first and the second polarization beam splitters is composed of a polarization beam splitter prism, consisting of two orthogonal prisms with a polarizing film securely attached between the two inclined surfaces thereof so that the angle of incoming to and outgoing from each of the first and the second polarization beam splitters can be made orthogonal, but the present invention is not limited to these embodiments, but is also applicable to a case where each of the first and the second polarization splitters is composed of a polarization beam splitter plate consisting of a transparent flat plate and a polarizing film securely attached thereon.

In the above embodiment, the phase element 46 is inserted between the first dichroic mirror 42 and the total reflection mirror 50, but the present invention is not limited to this embodiment.

For instance, the embodiments shown in FIG. 2 and FIG. 3 are also applicable to a case where the phase element 46 is inserted between the total reflection mirror 50 and the second dichroic mirror 44, a case where the phase element 46 is inserted between the first dichroic mirror and the total reflection mirror 48, and a case where the phase element 46 is inserted between the total reflection mirror 48 and the second dichroic mirror 44.

Further, the embodiments shown in FIG. 2 and FIG. 3 are also applicable to a case where the phase element 46a, shown in FIG. 6, is substituted for the total reflection mirror 48 in the case where the phase element 46 is inserted between the first dichroic mirror 42 and the total reflection mirror 50.

Further, the embodiments shown in FIG. 4 and FIG. 5 are applicable to a case where the phase element 46 is inserted between the total reflection mirror 50 and the second dichroic mirror 44a, a case where the phase element 46 is inserted between the first dichroic mirror 42 and the third dichroic mirror 62, and a case where the phase element 46 is inserted between the third dichroic mirror 62 and the second dichroic mirror 44a.

In the above embodiment, the dichroic mirror (e.g., the dichroic mirrors 42 and 44 shown in FIG. 2 or FIG. 3, the dichroic mirrors 42, 44a and 62 shown in FIG. 4 or FIG. 5) is used as a constituent of the color separation element for separating the first, the second and the third colors in predetermined directions, but the present invention is not limited to this embodiment and is also applicable to a case where the prism is substituted for the dichroic mirror.

The above embodiment is concerned with a case where the first, the second and the third color lights are the red, blue and green lights respectively, but the present invention is not limited to this embodiment and is also applicable to a case where the first, the second and the third color lights are of the colors other than the red, blue and green, or the same three different colors occurring in different order.

For instance, the present invention is applicable to a case where the first color light is a blue color light; the second color light is a green color light; the third color light is a red color light.

INDUSTRIAL APPLICABILITY

As discussed in the foregoing, with the reflection liquid crystal projector according to the present invention, not only the number of the polarization beam splitters, which is three in the case of a conventional projector, can be reduced to two but also the costly cross prism can be omitted, thereby contributing to the reduction of the price and the weight. Further, by substituting the polarization beam splitter prism for the polarization beam splitter, the angle of incidence of the light on the polarization beam splitter can be made orthogonal to eliminate the aberration. Further, by integrating the first and the second polarization beam splitters and the dichroic prism into a prism block, the number of the components can be reduced, resulting in the ease of assembly.

What is claimed is:

1. A reflection liquid crystal projector for synthesizing a first, a second and a third color light into a color image to be displayed on a screen through a projection lens and comprising: a light source for outputting a white light; a polarized light conversion element for converting the white light outputted from the light source to either an S-polarized light or a P-polarized light; a color separation element for separating the polarized light, outputted from the polarized light conversion element, into a first color light, a second color light and a third color light and outputting in the same direction two of the three color lights, the two color lights being differentiated in polarization, the color separation element comprising a first dichroic mirror for transmitting the first and second color lights while reflecting the third color light with respect to the polarized light outputted from the polarized light conversion element, a first total reflection mirror for reflecting the first and the second color lights, which have passed through the first dichroic mirror, in a direction altered by 90°, a second total reflection mirror for reflecting the third color light, which has been reflected by the first dichroic mirror, in a direction altered by 90°, a second dichroic mirror for transmitting one of the first and the second color lights, which have been reflected by the first total reflection mirror, while reflecting the other color light, and reflecting for output the third color light reflected by the second total reflection mirror, and a phase element provided in an optical path, through which the third color light reflected by the first dichroic mirror arrives at the second dichroic mirror by way of the second total reflection mirror, and designed for converting the direction of the polarization of the third color light reflected by the first dichroic mirror; a first polarization beam splitter for transmitting one of the two color lights outputted in the same direction from the color separation element, so as to fall on a corresponding one of a first, a second and a third reflection liquid crystal panel and be reflected thereby for being outputted while reflecting the other color light onto a corresponding one of the first, second and third reflection liquid crystal panels to be reflected thereby for being outputted; a second polarization beam splitter for letting the remaining color light, outputted from the color separation element, fall on a corresponding one of the first, second and third reflection liquid crystal panels for outputting the reflected light; and a dichroic prism for outputting the synthesized light of the first, second and third color-lights outputted from the first and second polarization beam splitters, wherein the first and second polarization beam splitters and the dichroic prism are integrated into a prism block and the phase element comprises the second total reflection mirror disposed so that the reflection face thereof is 45° to the incoming color light falling thereon and a ¼ wavelength film securely attached to the reflection face of the second total reflection mirror.

2. The reflection liquid crystal projector of claim 1, wherein the second polarization beam splitter comprises first and second polarization beam splitter prisms.

3. A reflection liquid crystal projector for synthesizing a first, a second and a third color light into a color image to be displayed on a screen through a projection lens and comprising: a light source for outputting a white light; a polarized light conversion element for converting the white light outputted from the light source to either an S-polarized light or a P-polarized light; a color separation element for separating the polarized light, outputted from the polarized light conversion element, into a first color light, a second color light and a third color light and outputting in the same direction two of the three color lights, the two color lights being differentiated in polarization, the color separation element comprising a first dichroic mirror for transmitting the first and second color lights while reflecting the third color light with respect to the polarized light outputted from the polarized light conversion element, a first total reflection mirror for reflecting the first and second color lights, which have passed through the first dichroic mirror, in a direction altered by 90°, a second total reflection mirror for reflecting the third color light, which has been reflected by the first dichroic mirror, in a direction altered by 90°, a second dichroic mirror for reflecting one of the first and second color lights, which have been reflected by the first total reflection mirror, while transmitting the other color light, and reflecting, for output, the third color light, which has been reflected by the second total reflection mirror, and a phase element provided in the optical path, through which the first and second color lights, which have passed through the first dichroic mirror, arrive at the second dichroic mirror by way of the first total reflection mirror so that the direction of the polarization of at least one of the first and second color lights, which have passed through the first dichroic mirror, can be converted by the phase element; a first polarization beam splitter for transmitting one of the two color lights outputted in the same direction from the color separation element, so as to fall on a corresponding one of a first, a second and a third reflection liquid crystal panel and be reflected thereby for being outputted while reflecting the other color light onto a corresponding one of the first, second and third reflection liquid crystal panels to be reflected thereby for being outputted; a second polarization beam splitter for letting the remaining color light, outputted from the color separation element, fall on a corresponding one of the first, second and third reflection liquid crystal panels for outputting the reflected light; and a dichroic prism for outputting the synthesized light of the first, second and third color lights outputted from the first and second polarization beam splitters, wherein the first and second polarization beam splitters and the dichroic prism are integrated into a prism block and the phase element comprises the first total reflection mirror disposed so that the reflection face thereof is 45° to the incoming light falling thereon and a ¼ wavelength film securely attached to the reflection face of the first total reflection mirror.

4. The reflection liquid crystal projector of claim 3, wherein the second polarization beam splitter comprises first and second polarization beam splitter prisms.

5. A reflection liquid crystal projector for synthesizing a first, a second and a third color light into a color image to be displayed on a screen through a projection lens and comprising: a light source for outputting a white light; a polarized light conversion element for converting the white light outputted from the light source to either an S-polarized light or a P-polarized light; a color separation element for separating the polarized light, outputted from the polarized light conversion element, into a first color light, a second color light and a third color light and outputting in the same direction two of the three color lights, the two color lights being differentiated in polarization, the color separation element comprising a first dichroic mirror for transmitting the first and second color lights while reflecting the third color light with respect to the polarized light outputted from the polarized light conversion element, a third dichroic mirror for transmitting one of the first and second color lights, which have passed through the first dichroic mirror, while reflecting the other color light, a total reflection mirror for reflecting the third color light, which has been reflected by the first dichroic mirror, in a direction altered by 90°, a second dichroic mirror for transmitting the color light reflected by the third dichroic mirror and reflecting the third color light, which has been reflected by the total reflection mirror, for output in the same direction, and a phase element provided in the optical path, through which the third color light, reflected by the first dichroic mirror, arrives at the second dichroic mirror by way of a second total reflection mirror so that the direction of polarization of the third color light, reflected by the first dichroic mirror, can be converted by the phase element; a first polarization beam splitter for transmitting one of the two color lights outputted in the same direction from the color separation element, so as to fall on a corresponding one of a first, a second and a third reflection liquid crystal panel and be reflected thereby for being outputted while reflecting the other color light onto a corresponding one of the first, second and third reflection liquid crystal panels to be reflected thereby for being outputted; a second polarization beam splitter for letting the remaining color light, outputted from the color separation element, fall on a corresponding one of the first, second and third reflection liquid crystal panels for outputting the reflected light; and a dichroic prism for outputting the synthesized light of the first, second and third color lights outputted from the first and second polarization beam splitters, wherein the first and second polarization beam splitters and the dichroic prism are integrated into a prism block and the phase element comprises the total reflection mirror disposed so that the reflection face thereof is 45° to the incoming light falling thereon and a ¼ wavelength film securely attached to the reflection face of the total reflection mirror.

6. The reflection liquid crystal projector of claim 5, wherein the second polarization beam splitter comprises first and second polarization beam splitter prisms.

7. A reflection liquid crystal projector for synthesizing a first, a second and a third color light into a color image to be displayed on a screen through a projection lens and comprising: a light source for outputting a white light; a polarized light conversion element for converting the white light outputted from the light source to either an S-polarized light or a P-polarized light; a color separation element for separating the polarized light, outputted from the polarized light conversion element, into a first color light, a second color light and a third color light and outputting in the same direction two of the three color lights, the two color lights being differentiated in polarization, the color separation element comprising a first dichroic mirror for transmitting the first and second color lights while reflecting the third color light with respect to the polarized light outputted from the polarized light conversion element, a third dichroic mirror for transmitting one of the first and second color lights which have passed through the first dichroic mirror, while reflecting the other color light, a total reflection mirror for reflecting the third color light, which has been reflected by the first dichroic mirror, in a direction altered by 90°, a second dichroic mirror for not only transmitting the color light, which has been reflected by the third dichroic mirror, but also reflecting the third color light, which has been reflected by the total reflection mirror, in the same direction, and a phase element provided in an optical path, through which the first and second color lights, which have passed through the first dichroic mirror, arrive at the third dichroic mirror so that the direction of polarization of at least one of the first and second color lights can be converted by the phase element; a first polarization beam splitter for transmitting one of the two color lights outputted in the same direction from the color separation element, so as to fall on a corresponding one of a first, a second and a third reflection liquid crystal panel and be reflected thereby for being outputted while reflecting the other color light onto a corresponding one of the first, second and third reflection liquid crystal panels to be reflected thereby for being outputted; a second polarization beam splitter for letting the remaining color light, outputted from the color separation element, fall on a corresponding one of the first, second and third reflection liquid crystal panels for outputting the reflected light; and a dichroic prism for outputting the synthesized light of the first, second and third color lights outputted from the first and second polarization beam splitters, wherein the first and second polarization beam splitters and the dichroic prism are integrated into a prism block and the phase element comprises a total reflection mirror disposed so that reflection face thereof is 45° to the incoming light falling thereon and a ¼ wavelength film securely attached to the reflection face of the total reflection mirror.

8. The reflection liquid crystal projector of claim 7, wherein the second polarization beam splitter comprises first and second polarization beam splitter prisms.

9. A reflection liquid crystal projector for synthesizing a first, a second and a third color light into a color image to be displayed on a screen through a projection lens and comprising: a light source for outputting a white light; a polarized light conversion element for converting the white light outputted from the light source to either an S-polarized light of a P-polarized light; a color separation element for separating the polarized light, outputted from the polarized light conversion element into a first color light, a second color light and a third color light and outputting in the same direction two of the three color lights, the two color lights being differentiated in polarization, the color separation element comprising a first dichroic mirror for transmitting the first and second color lights, while reflecting the third color light with respect to the polarized lights outputted from the polarized light conversion element, a third dichroic mirror for transmitting one of the first and second color lights, which have passed through the first dichroic mirror, while reflecting the other color light, a total reflection mirror for reflecting the third color light, which has been reflected by the first dichroic mirror, in a direction altered by 90°, a second dichroic mirror for not only transmitting the color light, which has been reflected by the third dichroic mirror but also reflecting the third color light, which has been reflected by the total reflection mirror, in the same direction, and a phase element provided in an optical path, through which the color light reflected by the third dichroic mirror arrives at the second dichroic mirror, so that the direction of the polarization of the color light reflected by the third dichroic mirror can be converted by the phase element; a first polarization beam splitter prism for transmitting one of the two color lights outputted in the same direction from the color separation element, so as to fall on a corresponding one of a first, a second and a third reflection liquid crystal and be reflected thereby for being outputted while reflecting the other color light onto a corresponding one of the first, second and third reflection liquid crystal panels to be reflected thereby for being outputted; a second polarization beam splitter prism for letting the remaining color light, outputted from the color separation element, fall on a corresponding one of the first, second and third reflection liquid crystal panels for outputting the reflected light; and a dichroic prism for outputting the synthesized light of the first, second and third color lights outputted from the first and second polarization beam splitters, wherein the first and second polarization beam splitter prisms and the dichroic prism are integrated into a prism block and the phase element comprises the total reflection mirror disposed so that the reflection face thereof is 45° to the incoming color light falling thereon and a ¼ wavelength film is securely attached to the reflection face of the total reflection mirror.

10. The reflection liquid crystal projector of claim 9, wherein the second polarization beam splitter comprises first and second polarization beam splitter prisms.

11. A reflection liquid crystal projector for synthesizing a first, a second and a third color light into a color image to be displayed on a screen through a projection lens and comprising: a light source for outputting a white light; a polarized light conversion element for converting the white light outputted from the light source to either an S-polarized light or a P-polarized light; a color separation element for separating the polarized light, outputted from the polarized light conversion element, into a first color light, a second color light and a third color light and outputting in the same direction two of the three color lights, the two color lights being differentiated in polarization, the color separation element comprising a first dichroic mirror for transmitting the first and second color lights while reflecting the third color light with respect to the polarized light outputted from the polarized light conversion element, a third dichroic mirror for transmitting one of the first and second color lights, which have passed through the first dichroic mirror, while reflecting the other color light, a first total reflection mirror for reflecting the third color light, which has been reflected by the first dichroic mirror, in a direction altered by 90°, a second dichroic mirror for transmitting the color light reflected by the third dichroic mirror and reflecting the third color light, which has been reflected by the first total reflection mirror, for output in the same direction, a phase element comprising a ½ wavelength plate disposed so that a face thereof is perpendicular to incoming color light falling thereon and provided in the optical path, through which the third color light, reflected by the first dichroic mirror, arrives at the second dichroic mirror by way of the first total reflection mirror, so that the direction of polarization of the third color light, reflected by the first dichroic mirror, can be converted by the phase element, an orthogonal mirror comprising second and third total reflection mirrors, which are arranged at 90° with respect to each other, to reflect the one of the first and second color lights transmitted from the third dichroic mirror in a parallel and opposite direction, a first relay lens disposed in the optical path of the one of the first and second color lights transmitted from the third dichroic mirror on the incident side of the second total reflection mirror and a second relay lens disposed in the optical path of the one of the first and second color lights transmitted from the third dichroic mirror between the second and third total reflection mirrors; a first polarization beam splitter for transmitting one of the two color lights outputted in the same direction from the color separation element, so as to fall on a corresponding one of a first, a second and a third reflection liquid crystal panel and be reflected thereby for being outputted while reflecting the other color light onto a corresponding one of the first, second and third reflection liquid crystal panels to be reflected thereby for being outputted; a second polarization beam splitter for letting the remaining color light, outputted from the color separation element, fall on a corresponding one of the first, second and third reflection liquid crystal panels for outputting the reflected light; and a dichroic prism for outputting the synthesized light of the first, second and third color lights outputted from the first and second polarization beam splitters.

12. The reflection liquid crystal projector of claim 11, wherein the first and second polarization beam splitters and the dichroic prism are integrated into a prism block.

13. The reflection liquid crystal projector of claim 11, wherein the second polarization beam splitter comprises first and second polarization beam splitter prisms.

* * * * *